United States Patent
Heller et al.

(10) Patent No.: US 6,846,048 B2
(45) Date of Patent: Jan. 25, 2005

(54) PNEUMATIC OPERATING UNIT FOR COMPRESSED-AIR BRAKES

(75) Inventors: Martin Heller, Unterschleissheim (DE); Benno Wenk, Wolnzach (DE); Stefan Sonntag, Taufkirchen (DE)

(73) Assignee: Knorr-Bremse Systeme für Schienenfahrzeuge GmbH, Munich (DE)

(*) Notice: Subject to any disclaimer, the term of this patent is extended or adjusted under 35 U.S.C. 154(b) by 39 days.

(21) Appl. No.: 10/215,042

(22) Filed: Aug. 9, 2002

(65) Prior Publication Data
US 2003/0075977 A1 Apr. 24, 2003

(30) Foreign Application Priority Data
Aug. 13, 2001 (DE) .......................... 101 39 772

(51) Int. Cl.[7] .............................................. B60T 13/26
(52) U.S. Cl. ..................................... 303/118.1; 303/127
(58) Field of Search ............................. 303/123, 127, 303/128, 9.66, 9.73, 22.7, 22.8, 56, 118.1

(56) References Cited

U.S. PATENT DOCUMENTS 4,017,125 A    4/1977  Durling
4,724,859 A  * 2/1988  Nakao et al. .................. 303/54
5,146,952 A  * 9/1992  Tamamori .................... 303/22.8

FOREIGN PATENT DOCUMENTS

| DE | DT 23 39 397 B2 | 12/1977 |
| FR | 1442389 | 4/1965 |
| FR | 1540693 | 10/1967 |
| GB | 1 453 715 | 7/1973 |

* cited by examiner

*Primary Examiner*—Thomas Williams
(74) *Attorney, Agent, or Firm*—Barnes & Thornburg LLP

(57) ABSTRACT

The invention relates to a pneumatic operating unit for compressed air brakes including a housing having at least one exterior compressed air connection device and at least one air-carrying connection. The operating unit further includes at least one piston, at least one piston rod, at least one valve body, at least one valve seat and at least one cylinder body fitted into the housing. The at least one cylinder body has at least one transverse connection and includes one or more of the at least one piston, valve seat and body. The at least one cylinder body also includes a seal in an axial direction between two transverse connections with respect to the housing so that the transverse connections are sealed off with respect to one another.

7 Claims, 2 Drawing Sheets

PNEUMATIC OPERATING UNIT FOR COMPRESSED-AIR BRAKES

BACKGROUND AND SUMMARY OF THE INVENTION

The invention relates to a pneumatic operating unit for compressed-air brakes.

Pneumatic operating units for compressed-air brakes, particularly of rail vehicles, are systems which are connected with their operating spaces and have the object of controlling or regulating the pressure in these operating spaces or of connecting the operating spaces with one another or of separating them from one another or of influencing the compressed-air flow by way of the connection.

For this purpose, the operating units contain valves which open and close the air paths to the operating spaces. These valves are moved by pistons which are loaded by pressures or pressure springs, so that an opening of valves will occur when the forces at the pistons are not in balance. The mentioned components are installed in housings which have connections to the operating spaces.

Particularly in the case of indirectly operating compressed-air brakes for trains, operating units with non-linear functions are known and are called control valves. They consist of a plurality of valves and pistons which influence one another and control the interaction of several operating spaces.

Since, corresponding to their object, the operating units may contain a varying number of pistons and valves in one operating unit, they differ from one another with respect to their construction. The housings of the known control valves are therefore spatial formations into which the valves, pistons, pressure springs and other components are installed from several sides.

The result is that the housings are complicated and need special castings. The valves and pistons to be installed are also special constructions with a low degree of standardization. The possibility of reacting to changing demands by means of these elements is low. Furthermore, the mounting of the known control valves requires high expenditures because a plurality of air-tight screwed and pressed connections has to be established. An additional consideration is the heavy weight and the large space requirement.

The present invention provides for a pneumatic operating unit which, because of its simple construction, on the one hand, permits a lower-cost mounting technique and, on the other hand, as a result of a modular construction, also in the case of a different volume of structural components, permits the use of as many identical or similar parts as possible.

The present invention provides for a construction in a simple axial form and without unnecessary air-tight screwed and pressed connections, which is different from the known three-dimensional formation.

According to the present invention, the pneumatic operating unit comprises a housing with at least one outer compressed-air connection device. At least one piston, piston rod, valve body and valve seat are arranged in the housing. The present invention is based on the possibility of fitting one or more cylinder bodies into the housing. The cylinder body may have different types of constructions, so that it can accommodate either a piston with the pertaining piston rod or is designed such that a valve body can be guided in it. The cylinder body may be designed such that, as a result of its shape, it directly forms a valve seat, or a valve seat may be separately inserted in it.

In order to connect the operating space or spaces in a cylinder body with the outer compressed-air connection device, one or several transverse connections from its interior to its outer surface are constructed in the cylinder body. These transverse connections are connected by way of air-carrying connections in the housing with the respective outer compressed air connection device. The connection of various transverse connections with one another by means of air-carrying connections in the housing is also conceivable.

In order to be able to construct different pressure stages in the individual operating chambers of the pneumatic operating unit, the operating unit may be designed such that the transverse connections are mutually sealed off in the axial direction. This is achieved by a surrounding sealing device at the extreme ends of the cylinder bodies, which sealing device seals off the cylinder bodies with respect to the housing.

When, in an embodiment of the present invention, the outer operating space of the outer cylinder body is to have a pressure difference with respect to the environment, here also, a sealing-off may be required with respect to the environment. This takes place by means of an end body, such as a cover plate, which is arranged on the outer face of the cylinder bodies situated at or on the housing. The end body is sealed off with respect to the outer cylinder body. In a further embodiment of the present invention, the respective outer cylinder body is sealed off in the area of the extreme axial end with respect to the housing, so that the transverse connection of the outer cylinder body is sealed off with respect to the environment. The sealing-off of the cover plate with respect to the cylinder body and the sealing-off of the cylinder body with respect to the housing can be implemented by a single surrounding sealing device.

In another embodiment of the present invention, the housing may have a rectangular cross-section. In the housing, an axial center bore is constructed into which the cylinder body or bodies is/are fitted. This embodiment is manufacturing and assembly-friendly.

According to the present invention, an arbitrary number of different or identical structural components in the form of cylinder bodies comprising a piston and a piston rod, or cylinder bodies comprising a valve can now very easily be inserted in the housing. As a result of a corresponding placing of the air connections in the housing between the outer connection devices and the transverse connections of the cylinder bodies or between various transverse connections, the operating spaces of the cylinder bodies can easily be provided with the desired compressed air.

Since, in addition, the cylinder bodies may have a similar construction despite having different functions, a cost-effective manufacturing is possible. As a result of the modular construction, the mounting of the operating units can easily be implemented and the assembly times are shortened in comparison to known constructions.

Other aspects and novel features of the present invention will become apparent from the following detail description of the invention when considered in conjunction with the accompanying drawings.

DETAILED DESCRIPTION OF THE PREFERRED EMBODIMENTS

Figure 1A:
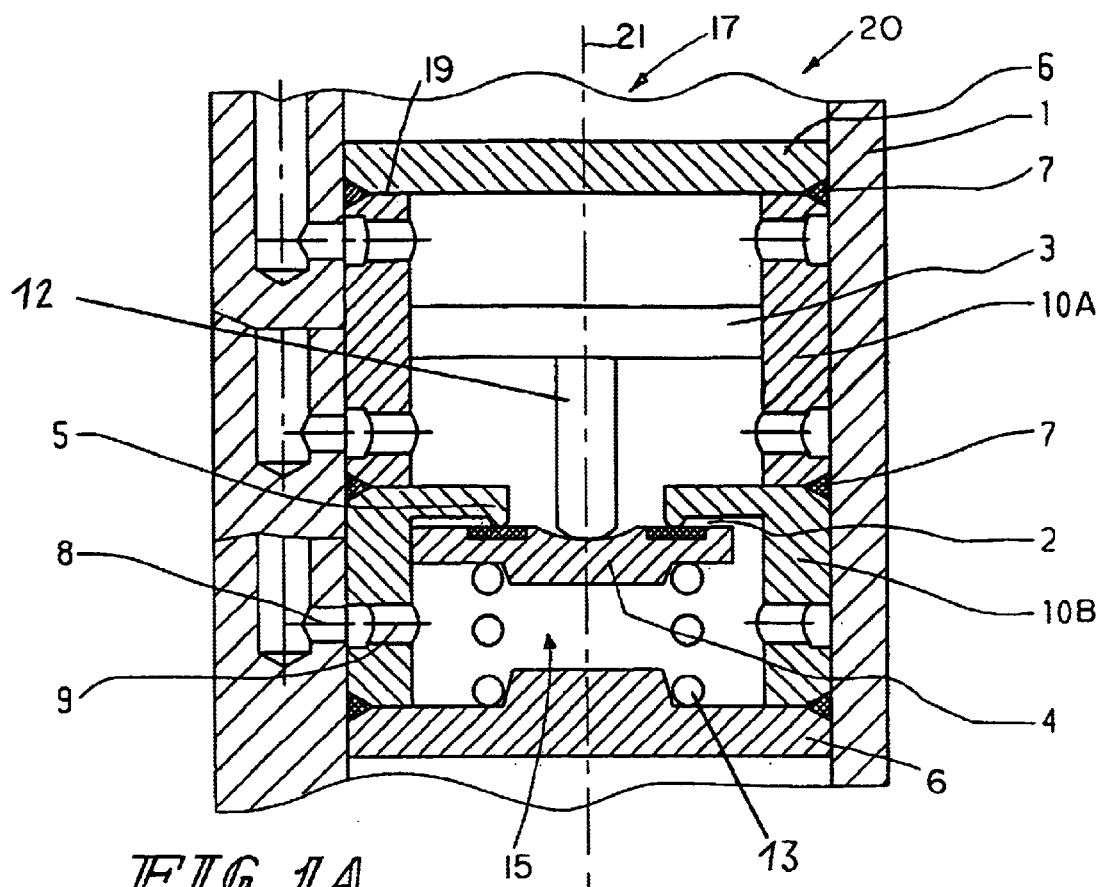
FIG. 1A is an axial cross-sectional view of a pneumatic operating unit, according to the present invention.

According to the present invention, a pneumatic operating unit may have a housing 1, at least one piston 3, at least one piston rod 12, at least one valve body 4, at least one valve seat 5 and at least one cylinder body 10 with at least one seal 7. The housing 1 may have at least one exterior compressed air connection device 11 and at least one air-carrying or air-guiding connection 8. The cylinder body may have at least one transverse connection 9 and may include one or more of the at least one piston 3, valve seat 5 and valve body 4.

Figure 1B:
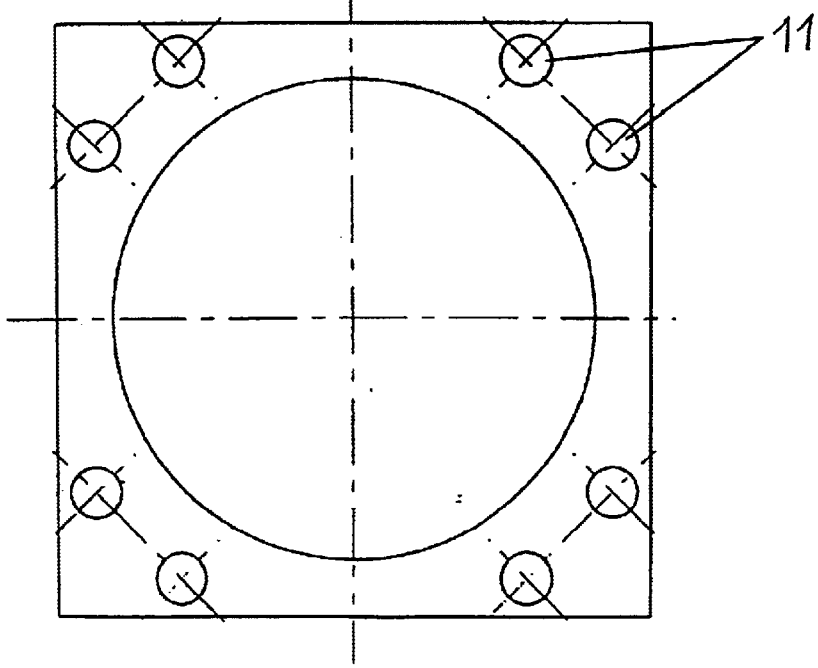
FIG. 1B is a top view of FIG. 1A.

The operating unit 20, shown in FIG. 1A, comprises a housing 1, two cylinder bodies 10A, B, a piston 3 with a piston rod 12 in a first cylinder body 10A and a valve body 4 in the second cylinder body 10B. The second cylinder body 10B is constructed such that it forms a valve seat 5. On each side of the piston 3, the first cylinder body 10A has two transverse connections 9. The second cylinder body 10B also has two transverse connections 9. All transverse connections 9 are connected by way of connections 8 in the housing 1 with outer or exterior connection devices 11, which devices are shown in FIG. 1B. An end body or cover plate 6 is arranged at or on each extreme end or exterior face 19 of one or a series of cylinder bodies 10A, B. Between the two cylinder bodies 10A, B, and between the cylinder bodies 10A, B and the cover plates 6, the cylinder bodies 10A, B are sealed off in a surrounding manner by sealing devices 7 with respect to the exterior housing 1. That is done so that the transverse connections 9 are sealed off with respect to one another and with respect to the environment, and spaces enclosed by the cylinder bodies 10A, B and cover plates 6 are sealed off with respect to the environment. Cylinder bodies 10A, B may be outer cylinder bodies in that they are each in an area of an outer axial end 17 of the housing 1. The housing 1 may have a rectangular cross-section, although other cross-sections are possible. The cylinder bodies 10A, 10B may be fitted into an axial center bore 21 the housing 1.

The valve arrangement 15 in the second cylinder body 10B, with the valve seat 5 and the valve body 4, is constructed as a tappet valve. The valve body 4 is sealed off by a sealing device 2 with respect to the valve seat 5. In a closing direction, the valve body 4 is loaded by a pressure spring 13 and, in an opening direction, it is loaded by the piston rod 12.

Figure 2:
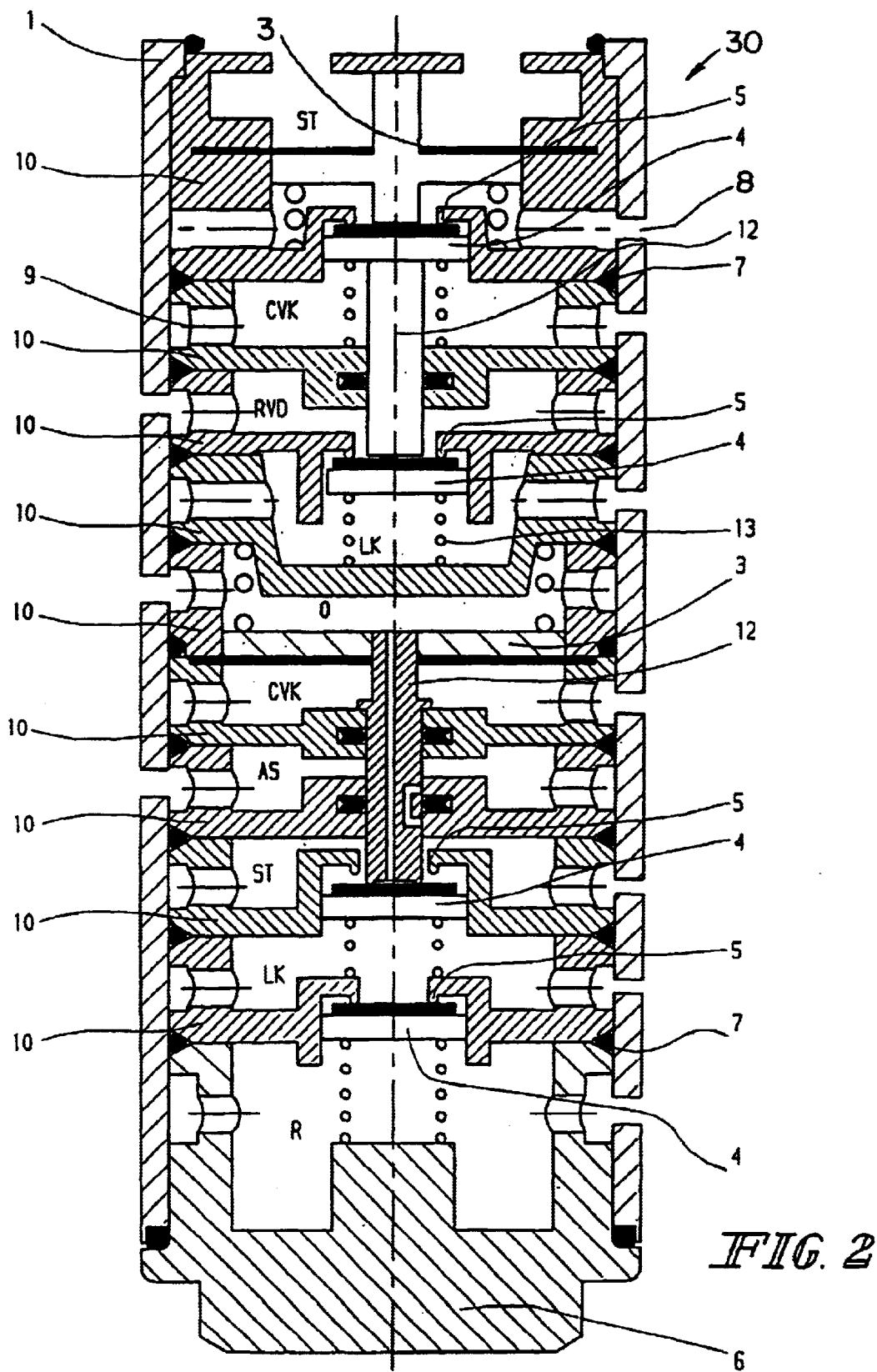
FIG. 2 is an axial cross-sectional view of a pneumatic operating unit for controlling a non-linear relationship between six pressures, according to the present invention.

FIG. 2 shows a pneumatic operating unit 30, according to the present invention, which controls a non-linear relationship between six pressures ST, CVK, RVD, LK, AS and R. Corresponding components are indicated by the same reference numbers as in FIG. 1. On the whole, nine cylinder bodies 10, two pistons 3 with piston rods 12 and four valve seats 5 with pressure springs 13 may be installed in housing 1. The transverse connections 9 lead into air-carrying connections in the housing 1, which are not shown in FIG. 2.

The above-mentioned parts referenced in FIG. 2 may be slid into the housing 1 during an assembly in a corresponding sequence, and may be fixed and caused to be sealed off by cover plates 6 (only one is shown in FIG. 2). The slid-in parts are turned parts which can be easily manufactured. The size of the pneumatic unit 30 may be considerably reduced by means of the axial arrangement shown. The assembly time can be considerably shortened in comparison to a three-dimensional arrangement (not shown).

According to the present invention, it is, for the first time, possible to construct a pneumatic operating unit in a very simple modular shape and thereby save production and assembly costs particularly in comparison to the previously known three-dimensional formations.

Although the present invention has been described and illustrated in detail, it is to be clearly understood that this is done by way of illustration and example only and is not to be taken by way of limitation. The spirit and scope of the present invention are to be limited only by the terms of the appended claims.

We claim:

1. A pneumatic operating unit for compressed air brakes, comprising:
   a housing having at least one exterior compressed air connection device and at least one air-carrying connection;
   at least one piston;
   at least one piston rod;
   at least one valve body;
   at least one valve seat;
   a first cylinder body fitted into the housing, the first cylinder body having one of the at least one pistons and one of the at least one piston rods and at least one transverse connection on each side of the at least one piston connected by the at least one air-carrying connection to the at least one exterior compressed air connection device;
   a second cylinder body having one of the at least one valve seats and one of the at least one valve bodies and at least one transverse connection which is connected through the at least one air-carrying connection to the at least one exterior compressed air connection device;
   the cylinder bodies having a cover plate arranged on each exterior face of the cylinder bodies; and
   between the cylinder bodies, and between the cylinder bodies and the cover plates, the cylinder bodies are sealed off in a surrounding manner with respect to the housing, so that the transverse connections are sealed off with respect to one another and with respect to the environment, and spaces enclosed by the cylinder bodies and the cover plates are sealed off with respect to the environment.

2. A pneumatic operating unit for compressed air brakes, comprising:
   a housing having at least one exterior compressed air connection device and at least one air-carrying connection;
   at least one piston;
   at least one piston rod;
   at least one valve body;
   at least one valve seat;
   a first cylinder body fitted into the housing, the first cylinder body having one of the at least one pistons and one of the at least one piston rods, and having at least one transverse connection on each side of the at least one piston connected by the at least one air-carrying connection to the at least one exterior compressed air connection device;
   a second cylinder body fitted into the housing, the second cylinder body having one of the at least one valve seats, one of the at least one valve bodies, and having at least one transverse connection from its interior to its surface, which is connected to and through the at least one air-carrying connection to the at least one exterior compressed air connection device;

the cylinder bodies having a cover plate arranged on each exterior face of the cylinder bodies;

between the cylinder bodies and the cover plates, the cylinder bodies are sealed off in an axial direction and in a surrounding manner with respect to the housing, so that the transverse connections are sealed off with respect to one another and with respect to the environment, and spaces enclosed by the cylinder bodies and the cover plates are sealed off with respect to the environment;

a valve arrangement with the at least one valve seat and the at least one valve body is constructed as a tappet valve;

the at least one valve body is sealed off by a sealing device with respect to the at least one valve seat;

in a closing direction, the at least one valve body is loaded by a pressure spring; and in an opening direction, the at least one valve body is loaded by the at least one piston rod.

3. The pneumatic operating unit according to claim 2, wherein the housing has at least one air-carrying connection between two transverse connections of the cylinder body.

4. The pneumatic operating unit according to claim 2, wherein a cover plate is arranged on each exterior face of the cylinder bodies.

5. The pneumatic operating unit according to claim 4, wherein the cover plate is sealed off with respect to an outer cylinder body.

6. The pneumatic operating unit according to claim 5, wherein the outer cylinder body in an area of an outer axial end is sealed off with respect to the housing so that the transverse connections are sealed off with respect to the environment.

7. The pneumatic operating unit according to claim 2, wherein the housing has a rectangular cross-section, and the at least one cylinder body is fitted into an axial center bore of the housing.

* * * * *